(12) United States Patent
Ku

(10) Patent No.: US 8,510,898 B2
(45) Date of Patent: Aug. 20, 2013

(54) WINDSHIELD WIPER BLADE ASSEMBLY

(75) Inventor: Yuan-Chin Ku, New Taipei (TW)

(73) Assignee: Dongguan Hongyi Wiper Co., Ltd. (CN)

( * ) Notice: Subject to any disclaimer, the term of this patent is extended or adjusted under 35 U.S.C. 154(b) by 178 days.

(21) Appl. No.: 13/048,530

(22) Filed: Mar. 15, 2011

(65) Prior Publication Data

US 2012/0180245 A1 Jul. 19, 2012

(30) Foreign Application Priority Data

Jan. 14, 2011 (CN) .......................... 2011 1 0007245

(51) Int. Cl.
*B60S 1/40* (2006.01)
(52) U.S. Cl.
USPC ................. 15/250.44; 15/250.32; 15/250.361
(58) Field of Classification Search
USPC 15/250.43, 250.44, 250.361, 250.451–250.47
See application file for complete search history.

(56) References Cited

U.S. PATENT DOCUMENTS

| 3,317,945 | A | * | 5/1967 | Ludwig ..................... 15/250.48 |
| 7,636,980 | B2 | * | 12/2009 | Nakano ..................... 15/250.201 |
| 2005/0011033 | A1 | * | 1/2005 | Thomar et al. ........... 15/250.201 |
| 2009/0320230 | A1 | * | 12/2009 | Boland ...................... 15/250.32 |
| 2011/0099743 | A1 | * | 5/2011 | Chiang ..................... 15/250.32 |

* cited by examiner

*Primary Examiner* — Mark Spisich
*Assistant Examiner* — Andrew A Horton
(74) *Attorney, Agent, or Firm* — Banner & Witcoff, Ltd.

(57) ABSTRACT

A windshield wiper blade assembly comprises: an elastic wiper blade; first and second housings secured to and covering a top end of the wiper blade and made from a plastic material; and a middle housing disposed between the first and second housings and having two end segments and a middle segment extending between the end segments. The end segments of the middle housing cover and are secured to the top end of the wiper blade at the end sections of the middle portion, respectively, and have ends in contact with ends of the first and second housings, respectively. The middle segment defines a frame space for extension of a connecting piece therein and includes a skeleton and a plastic molding layer molded over the skeleton.

11 Claims, 8 Drawing Sheets

WINDSHIELD WIPER BLADE ASSEMBLY

CROSS-REFERENCE TO RELATED APPLICATION

This application claims priority of Chinese Application No. 201110007245.3, filed on Jan. 14, 2011.

BACKGROUND OF THE INVENTION

1. Field of the Invention

This invention relates to a windshield wiper blade assembly, more particular to a windshield wiper blade assembly including an elastic wiper blade and a housing covering the wiper blade and having a portion that is composed of a skeleton of a metal and a plastic molding layer molded over the skeleton.

2. Description of the Related Art

A conventional vehicle windshield wiper includes an elongate elastic blade, an elongate blade support of a metal for supporting the elastic blade thereon, a connecting piece secured to the blade support, a wiper arm pivoted to the connecting piece, and a motor for driving movement of the wiper arm together with the blade. The blade support of the conventional windshield wiper is normally formed by interconnecting a plurality of metal pieces, which considerably increases the weight of the windshield wiper and requires many connecting means to interconnect fixedly the metal pieces, and which, in turn, increases the manufacturing time and costs.

SUMMARY OF THE INVENTION

Therefore, an object of the present invention is to provide a windshield wiper blade assembly that can overcome the aforesaid drawbacks associated with the prior art.

According to the present invention, there is provided a windshield wiper blade assembly adapted to be connected to a wiper arm through a connecting piece. The windshield wiper blade assembly comprises: an elastic wiper blade having first and second end portions and a middle portion extending between the first and second end portions, the middle portion having two end sections and a middle section extending between the end sections; elongate first and second housings secured to and covering a top end of the wiper blade at the first and second end portions of the wiper blade, respectively, and made from a plastic material; and an elongate middle housing disposed between the first and second housings and having two end segments and a middle segment extending between the end segments. The end segments of the middle housing cover are secured to the top end of the wiper blade at the end sections of the middle portion of the wiper blade, respectively, and have ends in contact with ends of the first and second housings, respectively. The middle segment defines a frame space for extension of the connecting piece therein and includes a skeleton and a plastic molding layer molded over the skeleton.

BRIEF DESCRIPTION OF THE DRAWINGS

In drawings which illustrate embodiments of the invention.

DETAILED DESCRIPTION OF THE PREFERRED EMBODIMENTS

Figure 1:
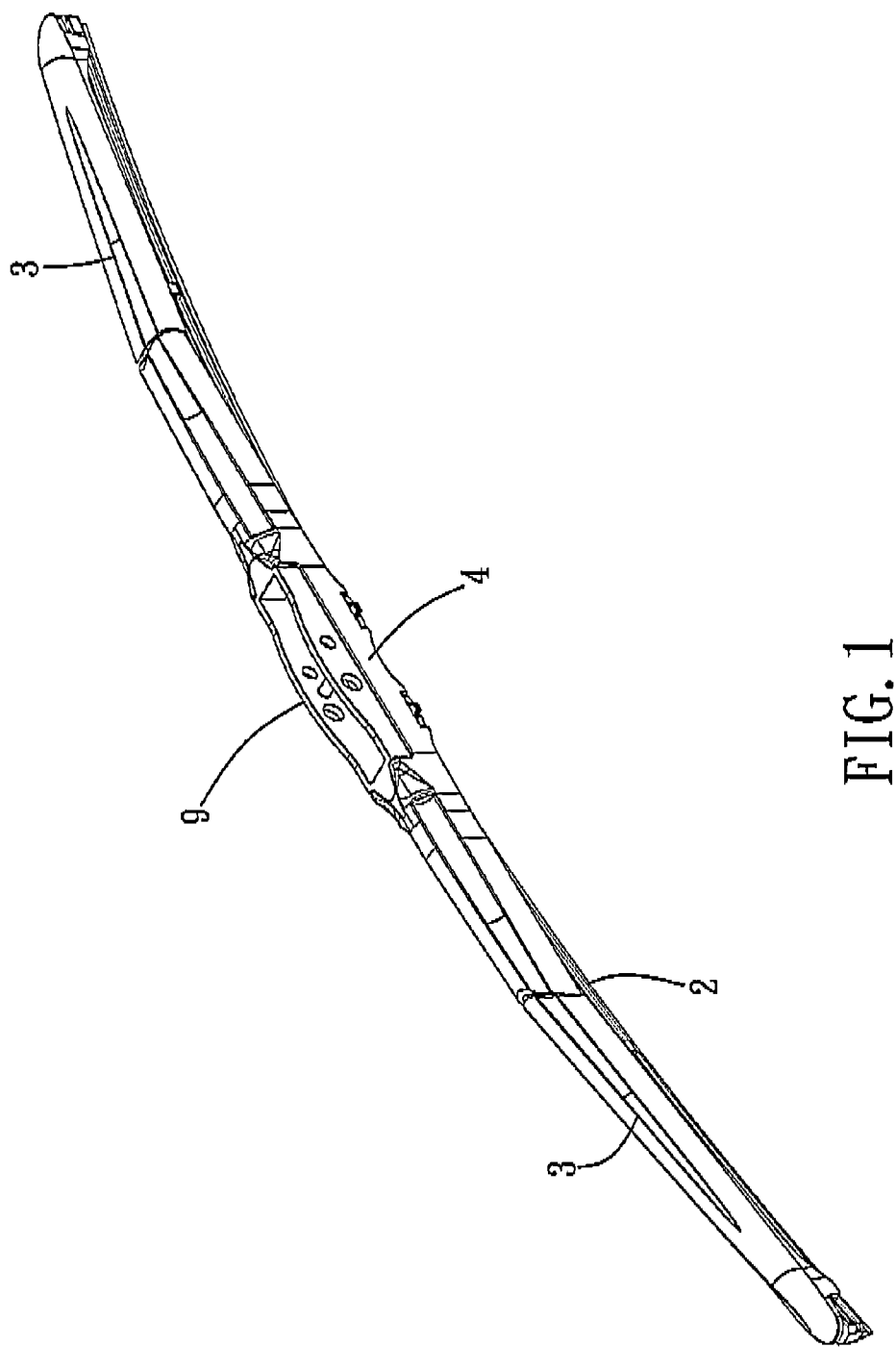
FIG. 1 is a perspective view of the first preferred embodiment of a windshield wiper blade assembly according to the present invention, with a connecting piece mounted thereon.

Before the present invention is described in greater detail with reference to the accompanying preferred embodiments, it should be noted herein that like elements are denoted by the same reference numerals throughout the disclosure.

Figure 2:
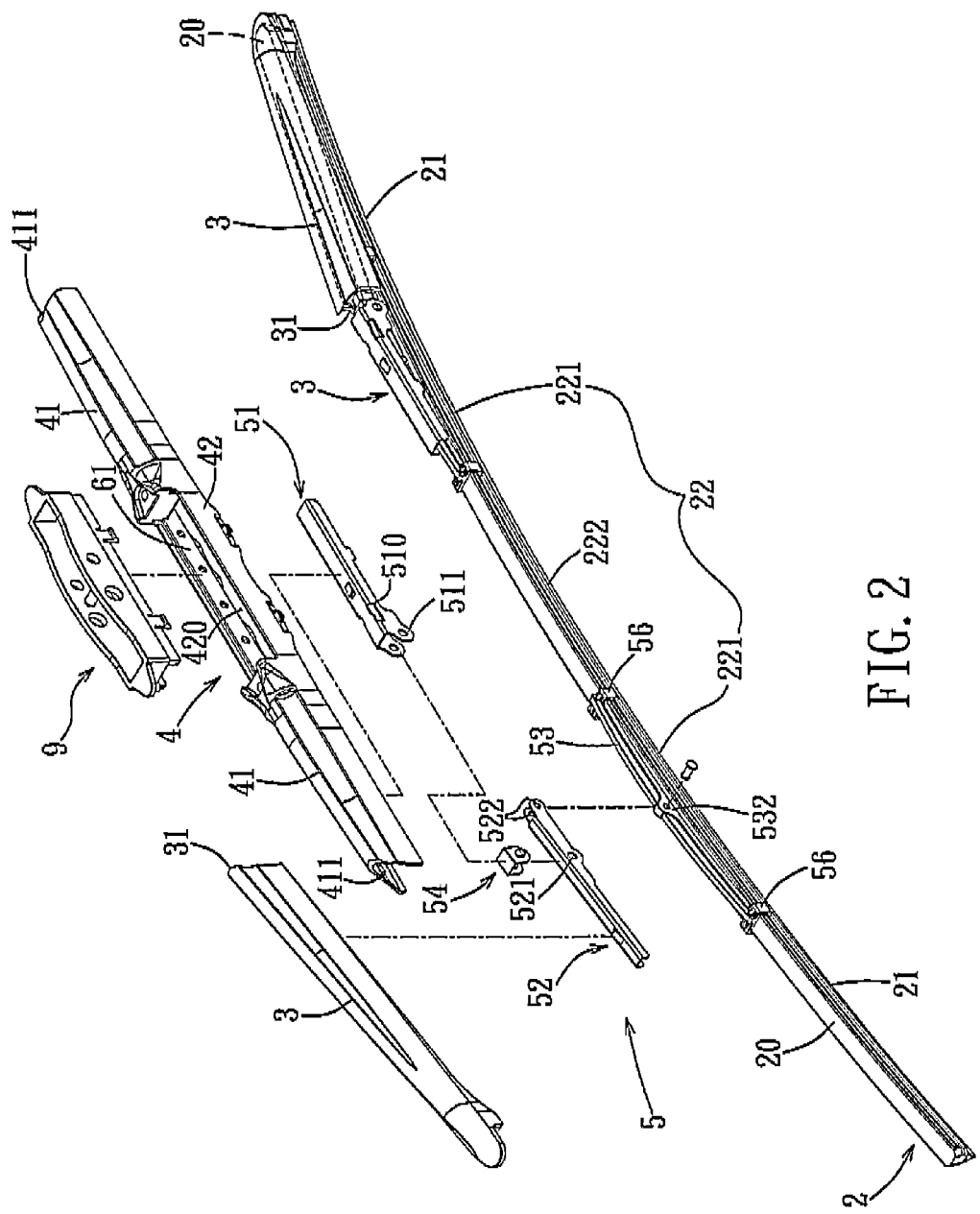
FIG. 2 is an exploded perspective view of the first preferred embodiment.

FIGS. 1 and 2 illustrate the first preferred embodiment of a windshield wiper blade assembly according to the present invention. The windshield wiper blade assembly is adapted to be connected to a wiper arm (not shown) through a connecting piece 9, and includes an elongate elastic wiper blade 2, elongate first and second housings 3, an elongate middle housing 4, and a pair of linking mechanisms 5. The wiper arm together with the wiper blade assembly is driven by a wiper motor (not shown) so as to permit the wiper blade 2 to wipe a windshield glass surface (not shown).

The elastic wiper blade 2 has first and second end portions 21 having the same structure, and a middle portion 22 extending between the first and second end portions 21. The middle portion 22 has two end sections 221 and a middle section 222 extending between the end sections 221.

The first and second housings 3 have the same structure, and are secured to and cover a top end 20 of the wiper blade 2 at the first and second end portions 21 of the wiper blade 2, respectively.

Figure 3:
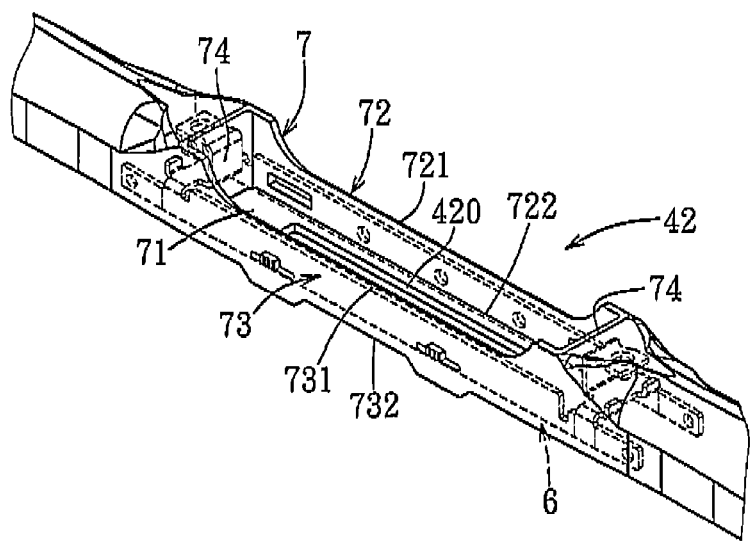
FIG. 3 is a fragmentary perspective view of a middle housing of the first preferred embodiment, viewed from a top side of the first preferred embodiment.
Figure 4:
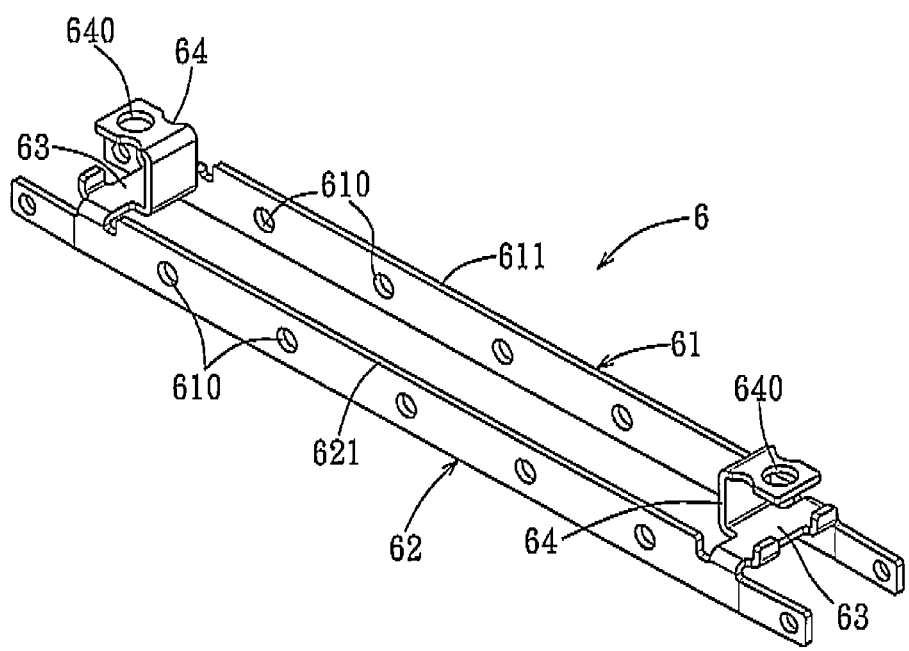
FIG. 4 is a perspective view of a skeleton of the middle housing of the first preferred embodiment.

The middle housing 4 is disposed between the first and second housings 3, and has two end segments 41 and a middle segment 42 extending between the end segments 41. The end segments 41 of the middle housing 4 cover and are secured to the top end 20 of the wiper blade 2 at the end sections 221 of the middle portion 22, respectively, and have ends 411 in contact with and matching ends 31 of the first and second housings 3, respectively. Referring to FIGS. 3 and 4, in combination with FIGS. 1 and 2, the middle segment defines a frame space 420 for extension of the connecting piece 9 therein, and includes a skeleton 6 and a plastic molding layer 7 molded over the skeleton 6. The end segments 41 of the middle housing 4 and the plastic molding layer 7 of the middle segment 42 of the middle housing 4 are integrally formed as one piece by injection molding.

The skeleton 6 includes elongate first and second beam-forming plates 61, 62 having the same structure, parallel to each other, and spaced apart from each other by the frame space 420, two interconnecting plates 63 spaced apart from each other and interconnecting top ends 611, 621 of the first and second beam-forming plates 61, 62 and two L-shaped plates 64 extending upwardly from the interconnecting plates 63, respectively, and disposed outwardly of the frame space 420. Each of the first and second beam-forming plates 61, 62 is formed with a plurality of through-holes 610. Each of the L-shaped plates 64 is formed with an aperture 640 disposed above and aligned with a respective one of the interconnecting plates 63.

Figure 5:
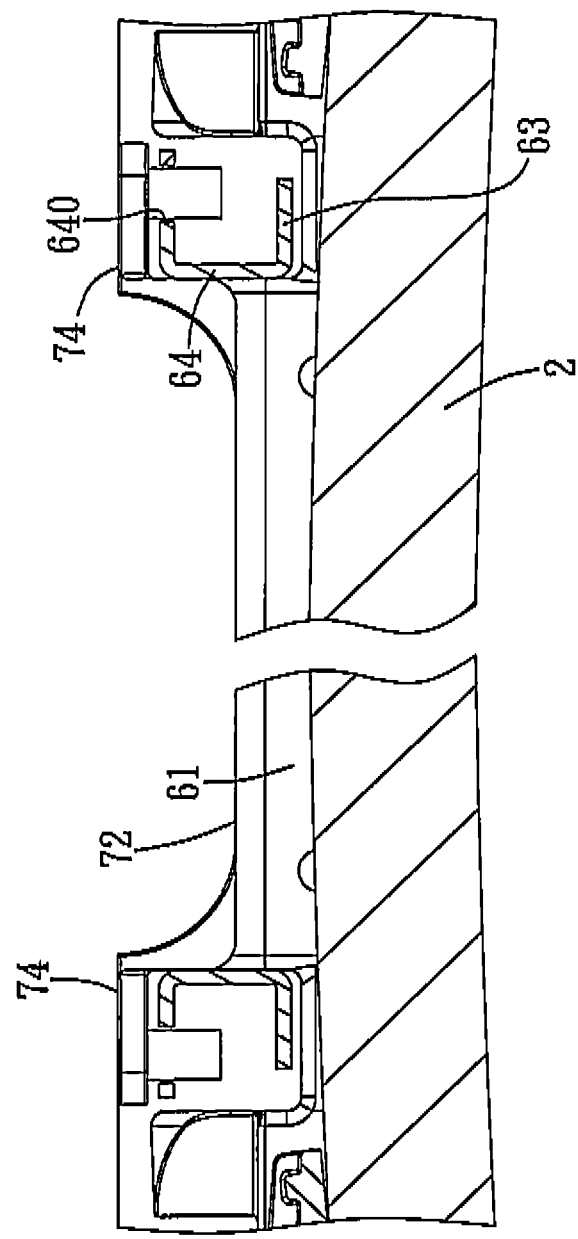
FIG. 5 is a fragmentary sectional view of the first preferred embodiment, viewed from a lateral side of the first preferred embodiment.
Figure 6:
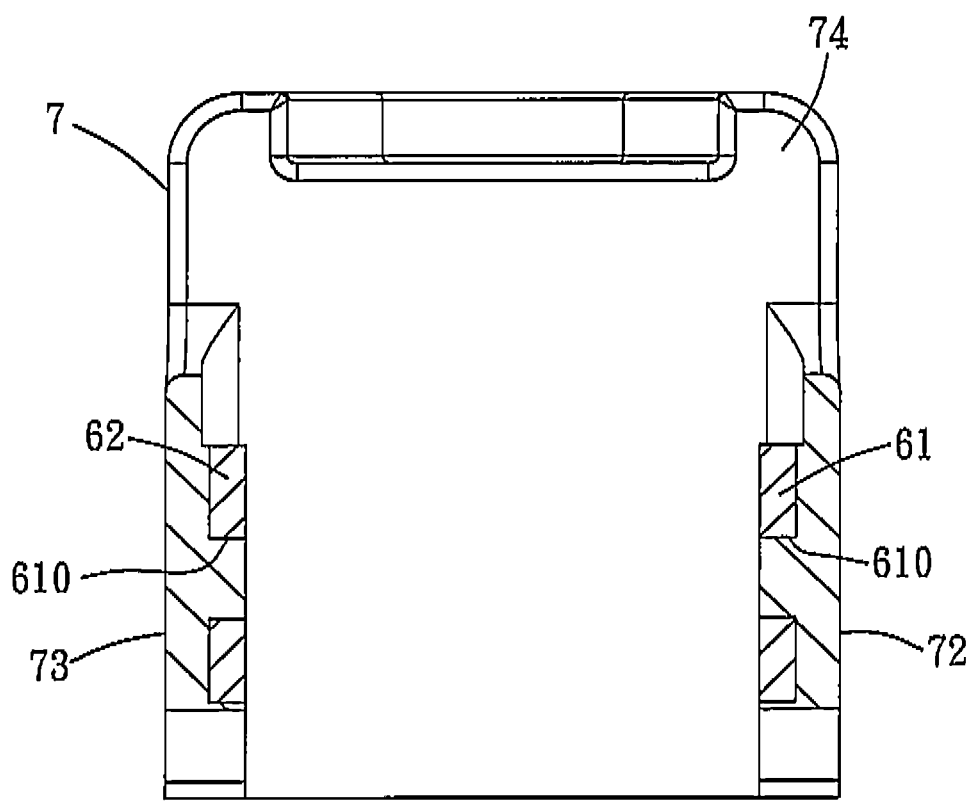
FIG. 6 is a fragmentary sectional view of the first preferred embodiment, viewed from one end of the first preferred embodiment.

Referring to FIGS. 5 and 6, in combination with FIGS. 4 and 5, the plastic molding layer 7 is molded over the first and second beam-forming plates 61, 62, the interconnecting plates 63, and the L-shaped plates 64, and extends through the through-holes 610 in the first and second beam-forming plates 61, 62 and the apertures 640 in the L-shaped plates 64. The plastic molding layer 7 has a planar base wall 71, first and second walls 72, 73 having the same structure, formed on the first and second beam-forming plates 61, 62 and extending upwardly from two opposite sides of the base wall 71, respectively, and two interconnecting walls 74 formed on the interconnecting plates 63 and the L-shaped plates 64 and interconnecting the first and second walls 72, 73. Each of the first and second walls 72, 73 of the plastic molding layer 7 has top and bottom ends 721(731), 722(732). The bottom ends 722, 732 of the first and second walls 72, 73 are at the same level. The top end 721 of the first side wall 72 has a height relative to the base wall 71 that is the same as that of the top end 731 of the second wall 73.

Preferably, the skeleton 6 is made from a metal. The first and second housings 3, the end segments 41 of the middle housing 4 and the plastic molding layer 7 of the middle segment 42 of the middle housing 4 are made of the same plastic material.

Figure 7:
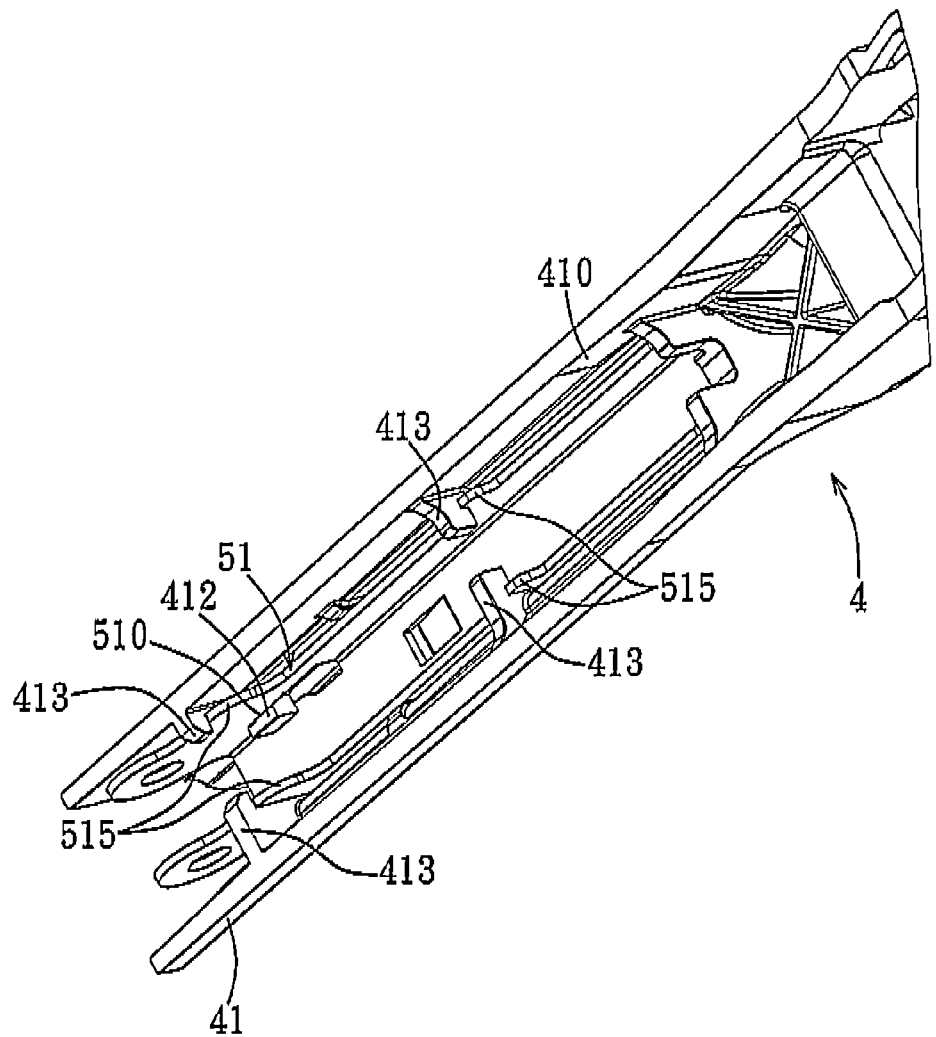
FIG. 7 is a fragmentary perspective view to illustrate how a linking mechanism is secured to the middle housing of the first preferred embodiment, viewed from a bottom side of the first preferred embodiment.

Referring to FIGS. 2 and 7, the middle housing 4 is securely mounted to the middle portion 22 of the wiper blade 2 through the linking mechanisms 5. Each of the linking mechanisms 5 includes a U-shaped first arm 51, a U-shaped second arm 52 extending into the first arm 51, and a third arm 53 extending into the second arm 52. The first arm 51 has a pivot end 511 pivoted to a middle pivot portion 521 of the second arm 52 through a pivot joint 54. The third arm 53 has two opposite ends, each of which is provided with a C-shaped clamping means 56 for clamping the top end 20 of the wiper blade 2, and a middle pivot portion 532 that is disposed between the C-shaped clamping means 56 and that is pivoted to a pivot end 522 of the second arm 52. The first arm 51 is formed with a pair of engaging holes 510. Each of the end segments 41 of the middle housing 4 has a generally inverted U-shaped cross section, defines an inner space 410, and is formed with a pair of engaging tongues 412 protruding into the inner space 410, and two pairs of abutting protrusions 413 disposed at a bottom side of the end segment 41. The first arm 51 of each of the linking mechanisms 5 is received in the inner space 410 in a respective one of the end segments 41. The engaging tongues 412 of each of the end segments 41 respectively extend into and engage the engaging holes 510 in the first arm 51 of a respective one of the linking mechanisms 5, and the abutting protrusions 413 of each of the end segments 41 respectively abut against protrusions 515 formed on a bottom end of the first arm 51 of a respective one of the linking mechanisms 5, so as to secure the middle housing 4 to the wiper blade 2.

Figure 8:
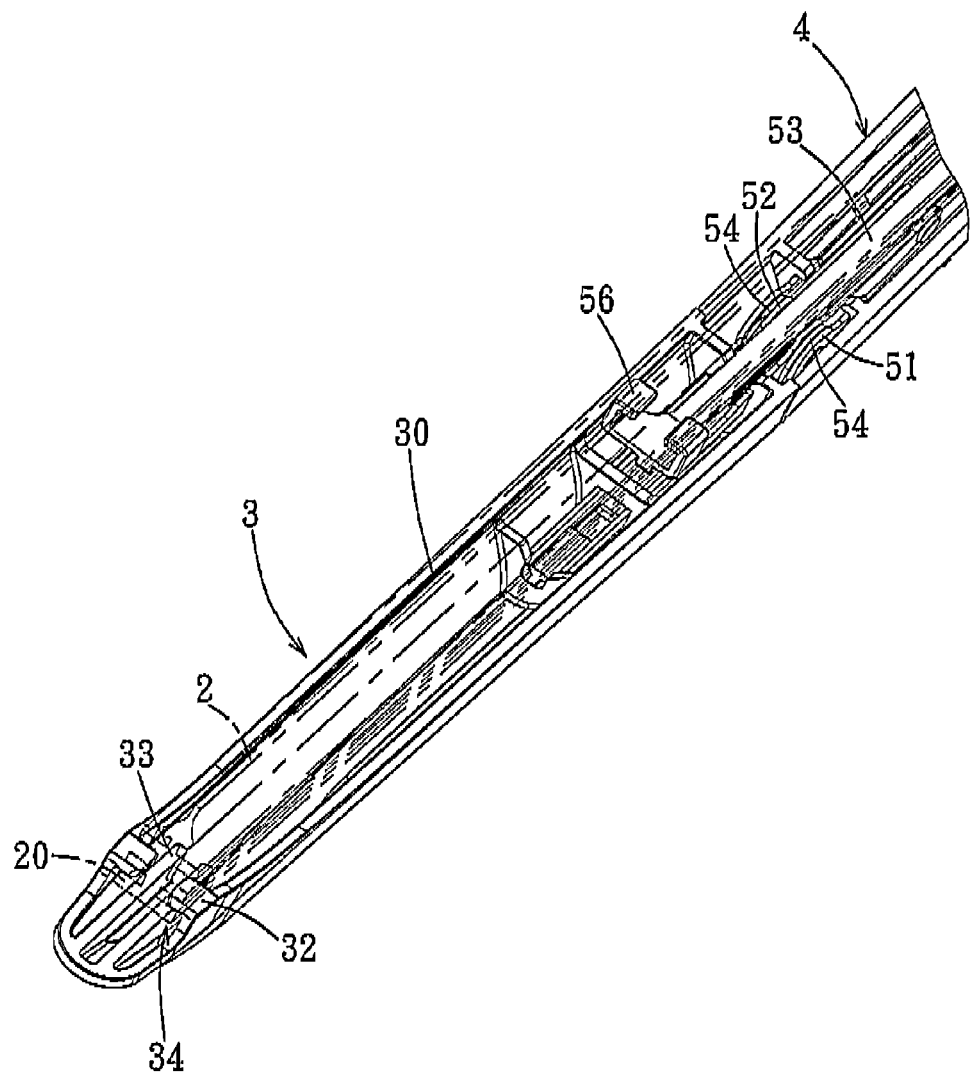
FIG. 8 is a fragmentary perspective view to illustrate how an elastic wiper blade is clamped and secured to first and second housings and the middle housing of the first preferred embodiment, viewed from a bottom side of the first preferred embodiment.

Referring to FIG. 8, in combination with FIG. 2, each of the first and second housings 3 has a generally inverted U-shaped cross section, defines an inner chamber 30 therein, and is formed with first and second clamping means 32, 33 that cooperatively define a clamping gap 34 therebetween. The first clamping means 32 is disposed outwardly of the inner chamber 30. The second clamping means 33 extends into the inner chamber 30. The top end 20 of the wiper blade 2 at each of the first and second end portions 21 of the wiper blade 2 extends through the clamping gap 34 in a respective one of the first and second housings 3 and is clamped between the first and second clamping means 32, 33.

Figure 9:
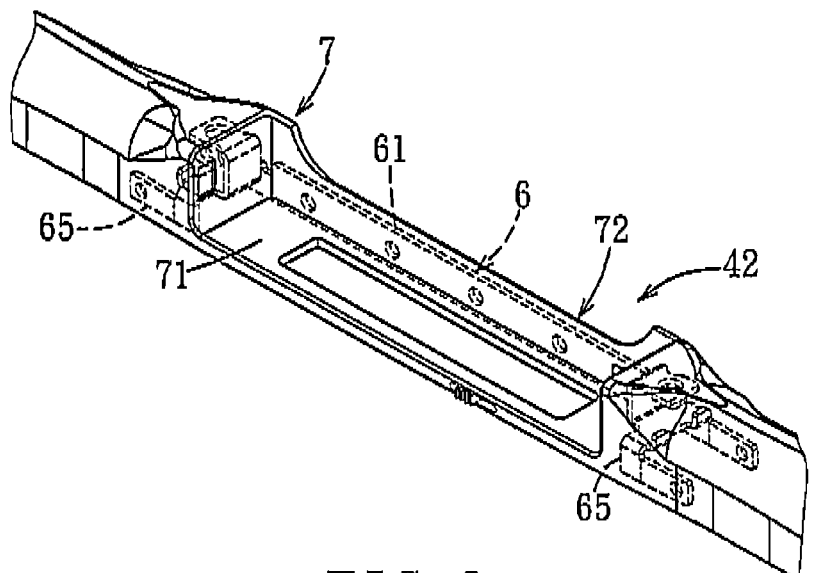
FIG. 9 is a fragmentary perspective view of the second preferred embodiment of the windshield wiper blade assembly according to the present invention.

FIG. 9 illustrates the second preferred embodiment of the windshield wiper blade assembly according to the present invention. The second preferred embodiment differs from the previous embodiment in that the skeleton 6 of the middle segment of the middle housing 4 includes an elongate beam-forming plate 61 and a pair of L-shape plates extending from the beam-forming plate 61 and opposite to each other along the length of the skeleton 6. The plastic molding layer 7 is molded over the beam-forming plate 61 and the L-shaped plates 65, and has a planar base wall 71, and a side wall 72 formed on the beam-forming plate 61 and extending upwardly from one side of the base wall 71.

Figure 10:
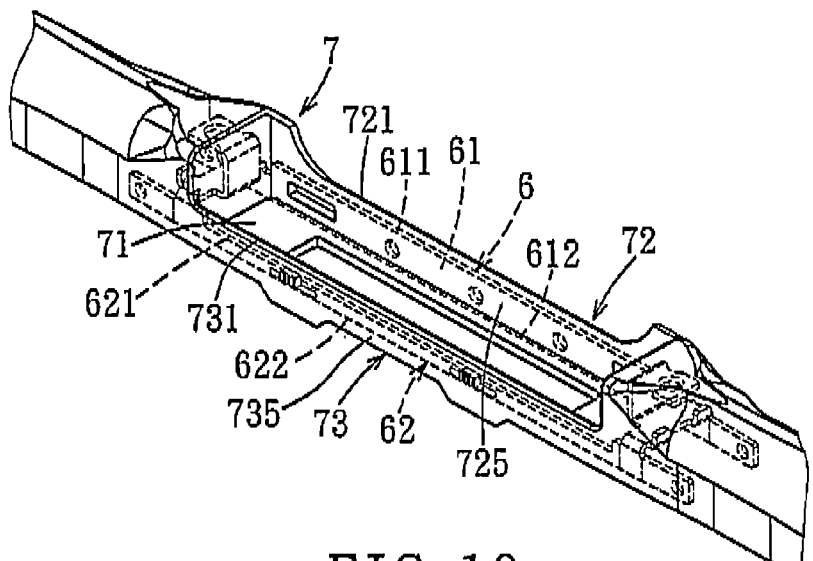
FIG. 10 is a fragmentary perspective view of the third preferred embodiment of the windshield wiper blade assembly according to the present invention.

FIG. 10 illustrates the third preferred embodiment of the windshield wiper blade assembly according to the present invention. The third preferred embodiment differs from the first preferred embodiment in that the first and second beam-forming plates 61, 62 have different widths. In this embodiment, the first and second beam-forming plates 61, 62 have top and bottom ends 611(621), 612(622). The bottom ends 612, 622 of the first and second beam-forming plates 61, 62 are disposed at the same level. The top end 611 of the first beam-forming plate 61 has a height greater than that of the top end 621 of the second beam-forming plate 62. The plastic molding layer 7 has a base wall 71 and first and second walls 72, 73 formed on the first and second beam-forming plates 61, 62 and extending upwardly from two opposite sides of the base wall 71, respectively. Each of the first and second walls 72, 73 of the plastic molding layer 7 has a top end 721(731) and a middle section 725(735). The top end 721 of the middle section 725 of the first side wall 72 has a height relative to the base wall 71 that is greater than that of the top end 731 of the middle section 735 of the second wall 73.

Since the first and second housings 3 and the end segments 41 of the middle housing 4, which are used to support the wiper blade 2, are made of the plastic material, the aforesaid drawbacks associated with the prior art can be eliminated.

With the invention thus explained, it is apparent that various modifications and variations can be made without departing from the spirit of the present invention.

What is claimed is:

1. A windshield wiper blade assembly adapted to be connected to a wiper arm through a connecting piece, said windshield wiper blade assembly comprising:
   an elastic wiper blade having first and second end portions and a middle portion extending between said first and second end portions, said middle portion having two end sections and a middle section extending between said end sections;
   elongate first and second housings secured to and covering a top end of said wiper blade at said first and second end portions of said wiper blade, respectively, and made from a plastic material; and an elongate middle housing disposed between said first and second housings and having two end segments and a middle segment extending between said end segments, said end segments of said middle housing covering and being secured to said top end of said wiper blade at said end sections of said middle portion of said wiper blade, respectively, and having ends in contact with ends of said first and second housings, respectively, said middle segment defining a frame space for extension of the connecting piece therein and including a skeleton and a plastic molding layer molded over said skeleton;

wherein said skeleton includes elongate first and second beam-forming plates spaced apart from each other by said frame space.

2. The windshield wiper blade assembly of claim 1, wherein said plastic molding layer is molded over said first and second beam-forming plates.

3. The windshield wiper blade assembly of claim 2, wherein said skeleton further includes two interconnecting plates spaced apart from each other and interconnecting said first and second beam-forming plates, said plastic molding layer being molded over said interconnecting plates.

4. The windshield wiper blade assembly of claim 3, wherein said interconnecting plates interconnect top ends of said first and second beam-forming plates, said skeleton further including two L-shaped plates extending upwardly from said interconnecting plates, respectively, and disposed outwardly of said frame space, each of said L-shaped plates being formed with an aperture disposed above and aligned with a respective one of said interconnecting plates, said plastic molding layer being molded over said L-shaped plates and extending through said aperture.

5. The windshield wiper blade assembly of claim 2, wherein each of said first and second beam-forming plates is formed with a plurality of through-holes, said plastic molding layer extending into said through-holes.

6. The windshield wiper blade assembly of claim 2, wherein said first and second beam-forming plates have top and bottom ends, said bottom ends of said first and second beam-forming plates being disposed at the same level, said top end of said first beam-forming plate having a height greater than that of said top end of said second beam-forming plate, said plastic molding layer having a base wall, and first and second side walls formed on said first and second beam-forming plates and extending upwardly from two opposite sides of said base wall, each of said first and second side walls of said plastic molding layer having a top end and a middle section, said top end of said middle section of said first wall having a height relative to said base wall that is greater than that of said top end of said middle section of said second wall.

7. The windshield wiper blade assembly of claim 1, wherein said skeleton is made from a metal.

8. The windshield wiper blade assembly of claim 1, wherein said plastic molding layer is made of said plastic material.

9. The windshield wiper blade assembly of claim 1, wherein each of said first and second housings and said end segments of said middle housing has a generally inverted U-shaped cross section.

10. The windshield wiper blade assembly of claim 9, wherein each of said first and second housings defines an inner chamber therein and is formed with first and second clamping means that cooperatively define a clamping gap therebetween, said first clamping means being disposed outwardly of said inner chamber, said second clamping means extending into said inner chamber, said top end of said wiper blade at each of said first and second end portions of said wiper blade extending through said clamping gap in a respective one of said first and second housings and being clamped between said first and second clamping means.

11. The windshield wiper blade assembly of claim 1, wherein said skeleton includes a pair of L-shaped plates extending from said beam-forming plates and opposite to each other along the length of said skeleton, said plastic molding layer being molded over said beam-forming plates and said L-shaped plates, and having a base wall, and a side wall formed on said beam-forming plates and extending upwardly from one side of said base wall.

* * * * *